US011150074B2

(12) United States Patent
Li

(10) Patent No.: US 11,150,074 B2
(45) Date of Patent: *Oct. 19, 2021

(54) NANOCOMPOSITE FORCE SENSING MATERIAL

(71) Applicant: NEW DEGREE TECHNOLOGY, LLC, Baltimore, MD (US)

(72) Inventor: Hao Li, Chandler, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/459,634

(22) Filed: Jul. 2, 2019

(65) Prior Publication Data

US 2019/0324588 A1    Oct. 24, 2019

Related U.S. Application Data

(63) Continuation of application No. 15/648,011, filed on Jul. 12, 2017, now Pat. No. 10,379,654.

(60) Provisional application No. 62/361,133, filed on Jul. 12, 2016, provisional application No. 62/365,055, filed on Jul. 21, 2016, provisional application No. 62/367,180, filed on Jul. 27, 2016.

(51) Int. Cl.
| | |
|---|---|
| *G01B 7/16* | (2006.01) |
| *G01L 1/18* | (2006.01) |
| *G01L 1/20* | (2006.01) |
| *H01H 1/029* | (2006.01) |
| *H01H 59/00* | (2006.01) |
| *H01H 57/00* | (2006.01) |

(52) U.S. Cl.
CPC .............. *G01B 7/18* (2013.01); *G01L 1/18* (2013.01); *G01L 1/20* (2013.01); *H01H 1/029* (2013.01); *H01H 59/0009* (2013.01); *H01H 2057/006* (2013.01)

(58) Field of Classification Search
CPC ... G06F 3/0414; H01H 1/029; H01H 59/0009
See application file for complete search history.

(56) References Cited

U.S. PATENT DOCUMENTS

| | | | | |
|---|---|---|---|---|
| 4,795,592 A | * | 1/1989 | Lander ..................... | C08K 3/04 252/502 |
| 4,900,497 A | * | 2/1990 | Lodini .................. | H01C 10/106 264/104 |
| 4,977,386 A | * | 12/1990 | Lodini .................. | B29C 70/882 338/114 |

(Continued)

FOREIGN PATENT DOCUMENTS

IN    33/2015    8/2015

OTHER PUBLICATIONS

International Search Report and Written Opinion of the International Searching Authority dated Sep. 22, 2017, issued in related International Application No. PCT/US2017/041687 (32 pages).

(Continued)

*Primary Examiner* — Kyung S Lee
(74) *Attorney, Agent, or Firm* — Nixon & Vanderhye, P.C.

(57) ABSTRACT

Nanocomposite sensing materials are formulated with low aspect ratio conductive fillers with close to or higher than percolation threshold in a low Poisson's Ratio matrix binder with a high gauge factor, low temperature coefficient of resistance (TCR), low temperature coefficient of gauge factor (TCGF), and low hysteresis.

29 Claims, 5 Drawing Sheets

(56) References Cited

U.S. PATENT DOCUMENTS

| | | | | |
|---|---|---|---|---|
| 5,132,583 | A * | 7/1992 | Chang | G01B 7/18 |
| | | | | 252/62.9 R |
| 5,294,374 | A * | 3/1994 | Martinez | H01C 7/13 |
| | | | | 252/516 |
| 5,850,171 | A | 12/1998 | Lin et al. | |
| 6,072,130 | A | 6/2000 | Burgess | |
| 6,359,546 | B1 | 3/2002 | Oh | |
| 6,727,111 | B2 | 4/2004 | Tsukada | |
| 6,943,660 | B2 * | 9/2005 | Bower | H01C 7/027 |
| | | | | 338/101 |
| 7,237,324 | B2 | 7/2007 | Matsukawa et al. | |
| 7,378,937 | B2 | 5/2008 | Tsukada | |
| 7,651,636 | B2 * | 1/2010 | Gramespacher | B82Y 30/00 |
| | | | | 252/500 |
| 7,776,383 | B2 * | 8/2010 | Yadav | A61L 27/06 |
| | | | | 427/8 |
| 8,471,719 | B2 * | 6/2013 | Hu | H03K 17/9625 |
| | | | | 340/657 |
| 8,765,027 | B2 * | 7/2014 | Lussey | G01L 1/20 |
| | | | | 252/500 |
| 9,396,849 | B1 | 7/2016 | Wyatt et al. | |
| 9,851,267 | B1 * | 12/2017 | Ma | C09D 5/24 |
| 10,379,654 | B2 * | 8/2019 | Li | G01L 1/20 |
| 2002/0178574 | A1 * | 12/2002 | Burgess | H01H 3/142 |
| | | | | 29/622 |
| 2004/0180203 | A1 * | 9/2004 | Yadav | B22F 1/0003 |
| | | | | 428/402 |
| 2008/0245867 | A1 | 10/2008 | Mynhardt | |
| 2009/0297739 | A1 | 12/2009 | Baily et al. | |
| 2012/0055257 | A1 * | 3/2012 | Shaw-Klein | H01L 41/1132 |
| | | | | 73/780 |
| 2012/0073388 | A1 * | 3/2012 | Chibante | G01L 1/20 |
| | | | | 73/862.627 |
| 2013/0082970 | A1 | 4/2013 | Frey et al. | |
| 2014/0260653 | A1 * | 9/2014 | Merrell | G01L 1/20 |
| | | | | 73/774 |
| 2015/0129808 | A1 * | 5/2015 | Mrozek | H01B 3/306 |
| | | | | 252/503 |
| 2015/0371902 | A1 | 12/2015 | Sakai | |
| 2016/0103545 | A1 | 4/2016 | Filiz et al. | |
| 2016/0122502 | A1 * | 5/2016 | Uibel | C08K 9/02 |
| | | | | 428/220 |
| 2018/0018055 | A1 | 1/2018 | Li | |
| 2018/0086946 | A1 * | 3/2018 | Hirao | C09J 133/08 |

OTHER PUBLICATIONS

International Preliminary Report on Patentability and Written Opinion of the International Searching Authority dated Jan. 24, 2019, issued in related International Application No. PCT/US2017/041687 (7 pages).

* cited by examiner

NANOCOMPOSITE FORCE SENSING MATERIAL

CROSS-REFERENCE TO RELATED APPLICATIONS

This application is a continuation application of application Ser. No. 15/648,011, filed Jul. 12, 2017, which claims benefit of U.S. Provisional Patent Application Nos. 62/361,133 filed Jul. 12, 2016; 62/365,055 filed Jul. 21, 2016; and 62/367,180 filed Jul. 27, 2016. The disclosure of each of these applications is incorporated herein in its entirety by reference.

STATEMENT REGARDING FEDERALLY SPONSORED RESEARCH OR DEVELOPMENT

Not applicable.

FIELD

The technology herein relates to a force sensing material and a precursor formulation of such a material, more particularly to applications of a nanocomposite material as a force sensing material, and even more particularly to applications of a piezo-resistive nanocomposite material to the force sensing mechanisms for a variety of applications.

BACKGROUND AND SUMMARY

A composite, especially a nanocomposite material comprising a conductive filler and an organic or polymer matrix, can be used to measure local mechanical strain by detecting the change in electrical conductivity and capacitance induced by said strain. It can be used in a broad array of applications where local strain or strain change; pressure or pressure change; or displacement, deformation, bending, or flexing, need to be measured. With a well calibrated temperature coefficient of the material and the device, it can also be used as a temperature sensor to measure local temperature change. With a well calibrated strain humidity relationship of the material and the device, it can also be used as a humidity sensor to measure local humidity.

The field of use for such a nanocomposite material includes but is not limited to force sensing and controls in any human machine interface for smart phones, tablets, personal computers, touch screens, virtual reality (VR) systems, gaming systems, consumer electronics, vehicles, scientific instruments, toys, remote controls, industrial machinery, bio-medical sensors to monitor heart rate, blood pressure, and the movements and acceleration of muscles, bones, joints and other body parts; robotic sensors to measure touch, local pressure, local tension, movements and acceleration of any parts of the robots; vibration sensors for buildings, bridges and any other man-made structures; sensors to monitor strain, pressure, movement, acceleration of any parts of vehicles that may be used in land, air, water, or space; movement, acceleration, and strain sensors that can be incorporated into smart fabrics; movement, acceleration, and force sensors that can be incorporated into microelectromechanical (MEMS) systems, and any other applications where local static or dynamic deformation, displacement, or strain need to be measured.

In this patent we propose a nanocomposite sensing materials with low aspect ratio conductive fillers with close to or higher than percolation threshold in a low Poisson's Ratio matrix binder with a high gauge factor, low temperature coefficient of resistance (TCR), low temperature coefficient of gauge factor (TCGF), and low hysteresis.

BRIEF DESCRIPTION OF THE DRAWINGS

These and other features and advantages will be better and more completely understood by referring to the following detailed description of presently preferred illustrative embodiments in conjunction with the drawings, of which.

DETAILED DESCRIPTION OF PRESENTLY PREFERRED EXAMPLE ILLUSTRATIVE NON-LIMITING EMBODIMENTS

Resistive Force Sensor

Figure 1A:
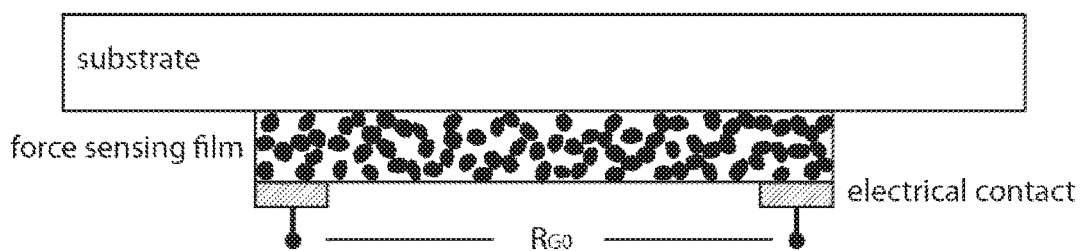
FIG. 1A shows an exemplary force sensing film comprising presently disclosed nanocomposite piezo-resistive material deposited on a substrate to form a variable resistor. Electrical contacts are made to measure the resistance of $R_{G0}$. The figure is not drawn to the real proportion for illustrative purposes, and the thickness of the substrate is typically much thicker than the force sensing film so that the film lies on one side of the neutral plane and only experiences either compressive or tensile strain.
Figure 1B:
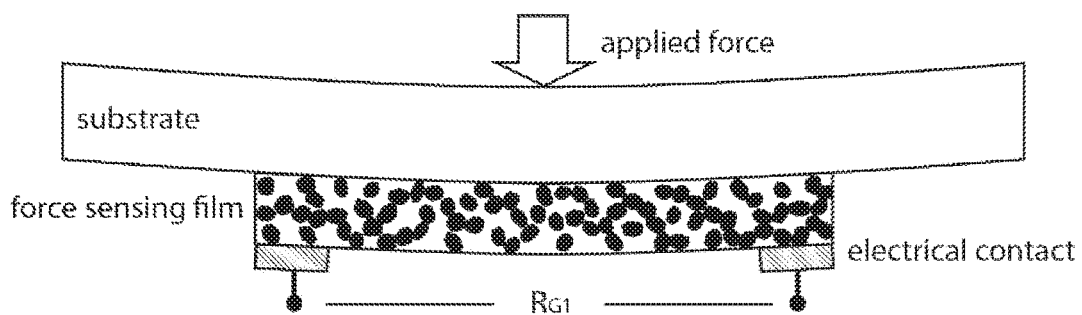
FIG. 1B shows an exemplary force sensing film comprising presently disclosed nanocomposite piezo-resistive material deposited on a substrate under an applied force. The resistance of the structure now changes to $R_{G1}$. Again, the actual thickness of the substrate is much thicker than the film and in this particular case the film is experiencing tensile strain.
Figure 2:
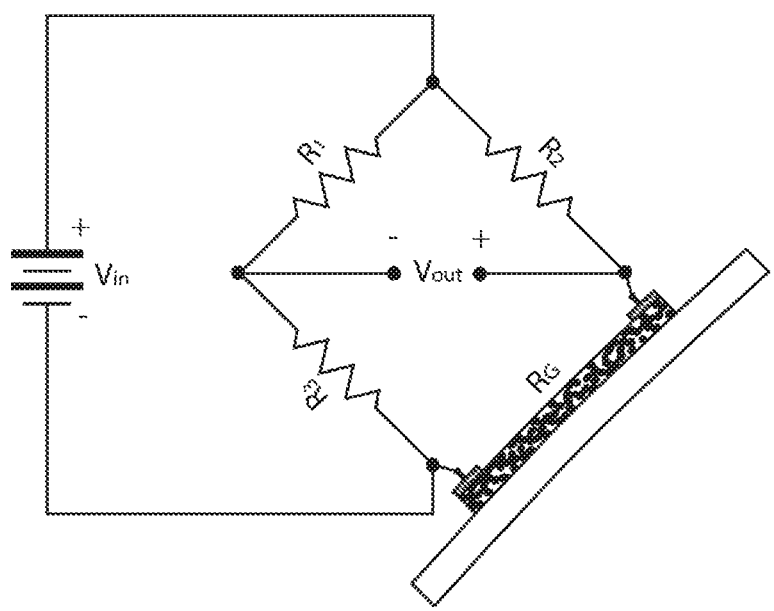
FIG. 2 shows an exemplary Wheatstone bridge where one arm of the bridge is replaced by the variable resistor comprising presently disclosed nanocomposite piezo-resistive material. $R_1$, $R_2$, $R_3$ are reference resistors and the change of the variable resistance can be calculated from $R_1$, $R_2$, $R_3$, $V_{in}$, and $V_{out}$.

One form of a nanocomposite material is a piezo-resistive material, in which the conductivity, or resistivity, changes when the material is under strain. Such a piezo-resistive material is widely used for force sensors. In one common form of such a force sensor, a thin strip of the piezo-resistive material is deposited, or attached, or bonded, onto a substrate to form a variable resistor, as shown in FIG. 1A. Any deformation of the substrate, as shown in FIG. 1B, will induce a change of resistance of the variable resistor. By measuring the change of resistance, i.e. using a Wheatstone bridge structure shown in FIG. 2, the local strain can be deduced. The ratio of the resistance change to the local mechanical strain is defined as Gauge Factor (GF), which can be expressed as:

$$GF = \frac{\frac{\Delta R}{R}}{\epsilon} = \frac{\frac{\Delta \rho}{\rho}}{\epsilon} + 1 + 2\nu \qquad \text{Eq. 1}$$

where $\epsilon$ denotes the mechanical strain; R, $\Delta R$, $\rho$, $\Delta \rho$ represent resistance, change in resistance, resistivity, and change in resistivity respectively, and $\nu$ is Poisson's Ratio, which is an intrinsic material property defined as the ratio between transverse strain ($e_t$) and longitudinal strain ($e_l$) in the elastic loading direction. For an isotropic, elastic, and homogeneous material, $-1 \le \nu \le 0.5$. Material with $\nu=0.5$ is an incompressible material, i.e., the volume of the material does not change under mechanical strain.

It has to be noted that such a resistive force sensor does not require a piezo-resistive material to operate. In the present disclosure, a piezo-resistive material is defined as having a substantial change in resistivity when a mechanical strain is present. Although almost all materials exhibit a certain degree of piezo-resistivity, for many the effect is too small to be useful for any practical purposes and can be regarded as non-piezo-resistive. Even for a non-piezo-resistive material, i.e. $\Delta \rho = 0$, the Gauge Factor is still non-zero as the resistance still changes due to geometric change of the variable resistor under strain, given that its Poisson's Ratio of the constituent material does not equal to 0.5. In another words, a piezo-resistive effect can still be observed using a non-piezo-resistive material. This is essentially the operating mechanism of metallic wire and foil strain gauges, where a metal is used as the material to form the resistor. For a resistive force sensor with non-piezo-resistive material, however, the theoretical upper limit of the Gauge Factor is approximately 3 and this severely limits usefulness in many applications.

Piezo-Resistive Materials, Nanocomposites, and Percolation

By introducing piezo-resistive material, the sensitivity of a force sensor can be increased significantly. For example, semiconductors, such as silicon or germanium, can have a gauge factor well above 100. The gauge factor in these materials in fact is dominated by $\Delta \rho / \rho$.

The semiconductor based piezo-resistive material, although superior in performance, requires high temperature and a complex manufacturing process, and they are also brittle and fragile. They are usually available as stand alone, discrete devices with relatively high unit cost. They are difficult to build onto flexible plastic substrates, into large array, into a variety of non-planar form factors; and placed accurately.

Composite, especially nanocomposite materials with conductive fillers and polymeric binders, can be processed similar to a polymer, they can be solution processed near room temperature, and can be printed and patterned using mature film forming and printing techniques such spin-coating, spray coating, screen printing, dip-coating, slot-die printing, ink-jet printing, etc. They are much more compatible with the consumer electronic industry where high sensitivity, compatibility with flexible and plastic substrates, compatibility with volume production, flexibility in design and form factors, accuracy of placement, and low cost are important.

Most nanocomposite piezo-resistive materials comprise conductive fillers, such as metals, conductive metal oxides, and carbons, in a polymer matrix. The filler size is usually in the sub-micron to a few nanometers range to ensure high dispersability of the fillers, i.e. processable viscosity property, sufficient stability, and good homogeneity.

There are two main conducting mechanisms for composite or nanocomposite piezo-resistive material: percolation and tunneling. These two mechanisms are closely related and tunneling can also be interpreted in the theoretic framework of percolation.

Percolation is a universal behavior in a multicomponent, or multiphase, material. When the loading of the fillers, or the minority component, increases, the fillers come in contact with each other and form clusters. At a certain volume loading, percolation occurs when a single cluster, or network, extends throughout the entire system, and the corresponding volume loading is called the percolation threshold. If the filler and matrix materials have significantly different physical properties, such as electrical conductivity, dielectric constant, thermal conductivity, or mechanical moduli, the physical properties undergo dramatic change when the volume loading of the fillers increases from below to above the percolation threshold. In the case of electrical conductivity, it manifests as an insulator-to-metal transition.

Because of the rapid change in physical properties as a function of loading near the percolation threshold, it is possible to design highly sensitive sensors by measuring the change of the particular physical property as a result of volume change, which is in turn induced by external physical conditions. When used as a resistive force sensor, if the Poisson's Ratio of the material is not 0.5, mechanical strain causes volume change in the material, hence the volume loading of the conductive filler. And if the initial loading of the filler is near the percolation threshold, it will induce significant change in conductivity.

Existing piezo-resistive sensing materials leveraging percolation behavior, however, typically suffer from issues such as low dynamic range, poor linearity, low signal to noise ratio, large temperature coefficient of resistance (TCR), large temperature coefficient of gauge factor (TCGF), poor reproducibility, and large hysteresis. Several factors contribute to the lack of success of the existing material system.

Figure 3:
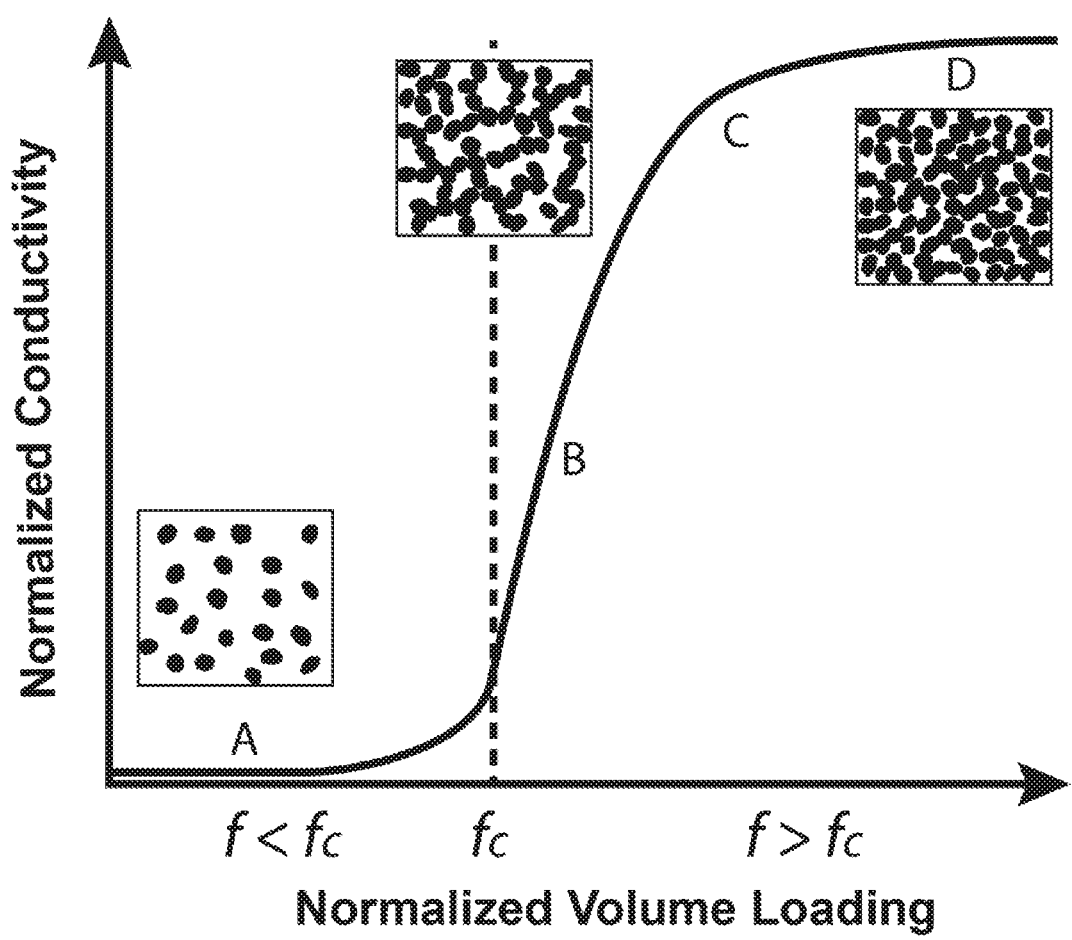
FIG. 3 show an exemplary normalized conductivity as a function of volume loading of a conductive filler in an insulating matrix. The insets are exemplary illustrations of the conductive filler configurations below, near, and above percolation threshold. In the A region, the conductivity of the material is too low to be useful; In the B region, the conductivity is very sensitive to the volume change but is also sensitive to environmental noise and is prone to filler movement, hence high hysteresis; In the C region, the material is less sensitive to volume change but because the filler loading is higher, it is also less sensitive to noise and filler movement; In the D region, the filler is approaching close packing density and the conductivity changes little with volume loading. Therefore, if extremely high sensitivity is needed, the material of choice may be in the B region; and if high signal-to-noise ratio, low TCR, low hysteresis are desired, the material of choice may be in the C region. The material in the C region also may have high manufacturability as described earlier.

First, percolation is a geometric phase transition, which is a second-order phase transition. It exhibits scaling and universality behavior. That is, regardless the size, shape, and respective physical properties of the filler and matrix, the relationship between a particular physical property and the loading, after renormalization, collapses into the same general curve. Using the conductivity of a binary (conductive filler and insulating matrix) system as an example, the general form takes the shape of $$\sigma \propto \sigma_1 (f-f_c)^{-s} \text{ for } f < f_c \qquad \text{Eq. 2}$$

$$\sigma \propto \sigma_2 (f-f_c)^{t} \text{ for } f > f_c \qquad \text{Eq. 3}$$

where $\sigma$, $\sigma_1$, $\sigma_2$ are the electrical conductivity of the composite material, filler, and matrix material respectively; $f$ and $f_c$ are the volume loading of the filler and the percolation threshold respectively; and s and t are critical exponents below and above percolation threshold respectively; s and t are mainly determined by dimensionality and vary slightly for different material systems. An example normalized conductivity vs. normalized filler loading relationship is illustrated in FIG. 3.

The percolation threshold, however, is a strong function of filler shape and aspect ratio. Spherical filler has a percolation threshold of ~16% by volume. In general, high aspect ratio fillers require lower percolation threshold. This contributed to the efforts to choose high aspect ratio fillers, such as silver nanowires, carbon nanotubes, graphene sheets, etc., to improve the sensitivity of the material. However, as shown in Eq. 2 and Eq. 3, because of the scaling behavior of the percolation phenomenon, all percolation systems, regardless of the size and shape of fillers, tend to have same general response curve. Therefore, the dynamic range and linearity will not change significantly by choosing higher aspect ratio fillers. Although high aspect ratio may result in lower percolation threshold, the high aspect ratio, and material structure to produce such a high aspect ratio, often makes the fillers difficult to be dispersed homogeneously and stably in the formulation and in the final nanocomposite. The reduction in dispersability is often much more than the reduced loading can compensate for. The poor dispersability makes such a nanocomposite material difficult to process and to have unacceptable low stability.

Another reason why high aspect ratio fillers were proven unsatisfactory is that percolation is a statistical phenomenon. It requires a large number of filler particles in the systems. For many high aspect ratio materials, such as silver nanowire, the aspect ratio is much higher than 100 to 1. To make a strain sensor with a less than 10 μm thick thin film resistor, there are only a handful of electrical contacts among the nanowires across the thickness of the resistor. Poor contact resistance at any one of these contacts due to environmental impact may lead to large fluctuation in overall resistance. The detected signal, therefore, appears to be stochastic, resulting in low signal-to-noise ratio and poor linearity.

Second, piezo-resistive material based on a percolation mechanism requires volume change under strain, that is, the matrix material has to be compressible. Materials with Poisson's ratio equal to or closer to 0.5, such as many silicone rubbers, are considered to be incompressible. The change in resistance of nanocomposite material with these materials as a matrix almost entirely comes from the change of resistor geometry, or contact area, and the high Poisson's Ratio actually maximize the geometric effect. Poisson's ratio for a stable, isotropic, and linearly elastic material falls in the range of −1 to 0.5. For a material that undergoes phase change under strain, or an inelastic material, or a highly anisotropic material, the value may go beyond this range. However, for all practical purposes, to achieve high gauge factor in a nanocomposite material with the loading of conductive fillers around percolation threshold, the matrix material needs to have a low Poisson's Ratio. This may reduce change in resistance resulting from geometric effect, because the resistance change generated by volume change is often much larger than the geometric effect, and the final material can have much a larger gauge factor.

Third, when a material is percolated, the resistivity of the material can behave either like a resistive network, or like a tunneling network. In the first scenario, the percolated conductive fillers conduct electrical current through direct contact among each other. In many cases, however, to improve the dispersability of the conductive fillers in a polymer matrix, the surfaces of the filler particles, either the surfaces of the primary particles or the surfaces of small aggregates or clusters, are covered by physi-sorbed or chemically bonded molecules, which often are insulating. These molecules may comprise surfactant, surface ligands, the matrix itself, or intentionally introduced tunneling barrier such as in the case of core-shell structured fillers with a conductive core and an insulating shell. This core-shell-like structure makes direct, ohmic contacts among the conductive fillers difficult, and the conductive mechanism is dominated by tunneling among the particles. This effect is less pronounced when filler particles are in the micrometer size because of the relatively small number of interfaces, but become important as the fillers size enters the nanometer regime as the surface area to volume ratio increases dramatically and the tunneling across interfaces becomes a dominant component of the overall conducting mechanism. The resistive network provides high linearity in the current vs voltage curve, while the tunneling mechanism, on the other hand, offers certain advantages such as high thermal stability, that is, the resistivity and gauge factor are less sensitive to temperature change. Low sensitivity to temperature is highly desirable in certain applications to distinguish strain induced response from temperature induced response. For many material systems, when temperature rises, the organic matrix often has a higher thermal expansion coefficient than the filler. If the conducting mechanism is dominated by a resistive network, then the conductivity of the nanocomposite decreases, i.e. the resistivity increases. Because the average distance among fillers increases, the material is said to have a positive TCR. If the conducting mechanism is dominated by tunneling, at high temperature, more carriers (such as electrons) can be thermally excited to tunnel across barrier. This will compensate the increased average distance and leads to a lower positive TCR or even a negative TCR.

This effect is illustrated in FIG. 4. FIG. 4A and FIG. 4B are an illustrative contact between two contacting conductive filler particles in a resistive network at different temperatures, with FIG. 4A at lower temperature and FIG. 4B at higher temperature. The two filler particles are either primary particles or small aggregates of clusters of the primary particles. These two particles are fully in contact with each other and the conducting mechanism is ohmic. The contact resistance is simply determined by the contact area. At higher temperature, assuming that the matrix material has a higher thermal expansion coefficient than the filler, the fillers are pulled apart as a result and the contact area between the two particles may reduce due to reorientation of the particles or deformation of the contact area, causing the resistivity of the system to increase, i.e. a positive TCR.

Figure 4A:
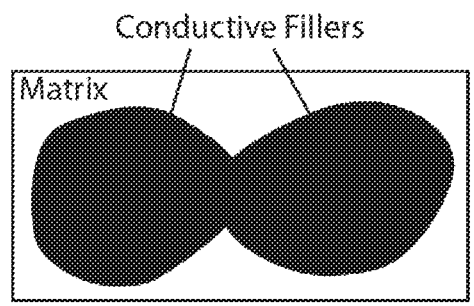
FIG. 4A shows an illustrative contact between two contacting conductive fillers in a resistive network. The two particles comprise either primary particles or small aggregates or clusters of primary particles. These two fillers are fully in contact with each other and the conducting mechanism is ohmic. The contact resistance is simply determined by the contact area.
Figure 4B:
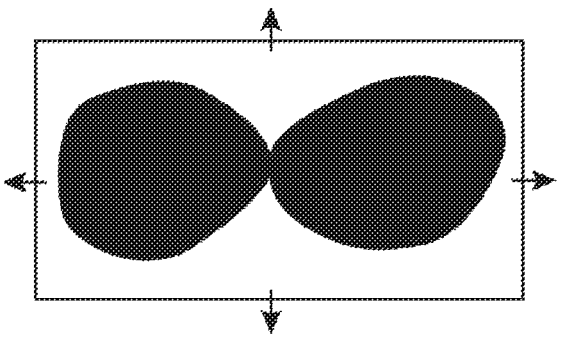
FIG. 4B shows the same illustrative contact between contacting conductive filler in a resistive network at higher temperature. Assume that the matrix material has a high thermal expansion coefficient than the filler. The fillers are pulled apart slightly and the contact area between the two particles may reduce due to reorientation of the particles or relaxation of previously deformed contact area, causing the resistivity of the system to increase, i.e. positive TCR.
Figure 4C:
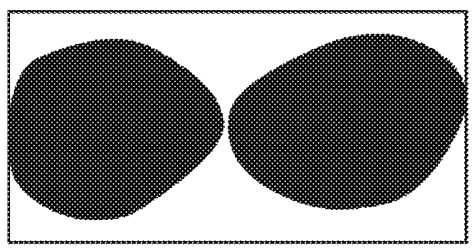
FIG. 4C shows an illustrative contact between two particles in a tunneling system. The two particles comprise either primary particles or small aggregates or clusters of primary particles. These two particles are separated by a thin insulating layer, either formed by the matrix itself, surface ligands, or intentionally introduced tunneling barrier such as a core-shell particle structure. The barrier is thin enough so that the electrical conduction between the two particles are through tunneling.
Figure 4D:
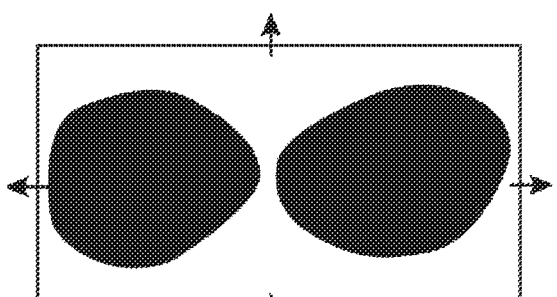
FIG. 4D shows the same illustrative contact between two particles in a tunneling system at higher temperature. Again assume that the matrix material has a higher thermal expansion coefficient than the filler. The fillers are pulled apart.
Figure 4E:
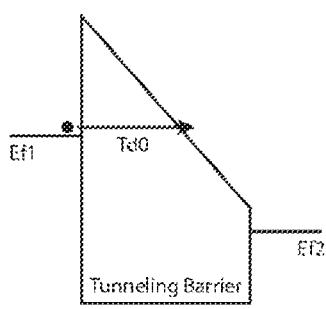
FIG. 4E shows the illustrative electronic structure corresponding to FIG. 4C assuming the tunneling mechanism is Fowler-Nordheim tunneling. Td0 is the illustrative tunneling distance of the carriers.
Figure 4F:
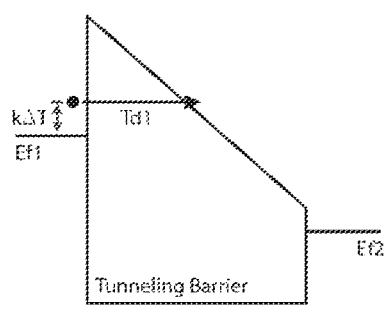
FIG. 4F shows the illustrative electronic structure corresponding to FIG. 4D. Due to the increase in particle distance, the width of the tunneling barrier also increases. However, because of the higher temperature, the carriers on average have kΔT higher energy, where k is Boltzmann is constant and ΔT is the temperature increase. The higher energy allows the carriers to tunnel through a narrower tunneling barrier, as illustrated in the FIG. 4F, compensating for the increased barrier distance. Td1 is the illustrative tunneling distance of the carriers. This type of system, therefore, may have much lower TCR or even negative TCR as compared to a resistive network system.

FIG. 4C and FIG. 4D show an illustrative contact between two particles in a tunneling system at different temperature. The two filler particles are either primary particles or small aggregates or cluster of the primary particles. These two particles are separated by a thin insulating layer, either formed by the matrix itself, surface ligands, or intentionally introduce tunneling barrier such as a core-shell particle structure. The barrier is thin enough so the electrical conduction between the two particles are through tunneling. Again assume that the matrix material has a higher thermal expansion coefficient than the filler. The fillers are pulled apart at higher temperature. FIG. 4E shows the illustrative electronic structure corresponding to FIG. 4C assuming the tunneling mechanism is Fowler-Nordheim tunneling, while FIG. 4F shows the illustrative electronic structure corresponding to FIG. 4D. Due to the increase in particle distance, the width of the tunneling barrier also increases. However, because of the higher temperature, the carriers on average have kΔT higher energy, where k is the Boltzmann constant and ΔT is the temperature increase. The higher energy allows the carriers to tunnel through a narrower tunneling barrier because of the shape of the tunneling barrier, compensating for the increased barrier distance, i.e. Td1≈Td0. This results in a lower TCR than the resistive network or even negative TCR. Even though in other types of tunneling barrier shapes, the tunneling distance may be larger at higher temperature, it is still compensated by the fact that more carriers are thermally excited and in general tunneling systems have lower TCRs than the resistive network system.

Figure 5A:
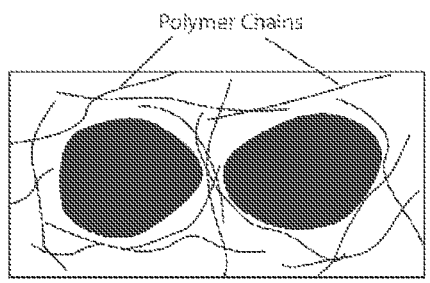
FIG. 5A shows an illustrative example of a tunneling gap between two conductive particles or clusters comprising polymer chains in the matrix.
Figure 5B:
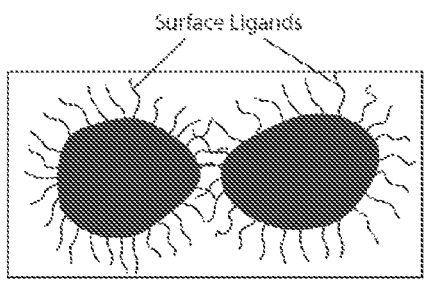
FIG. 5B shows an illustrative example of a tunneling gap between two conductive particles or clusters comprising organic ligands grafted on the surface of the particles or clusters.
Figure 5C:
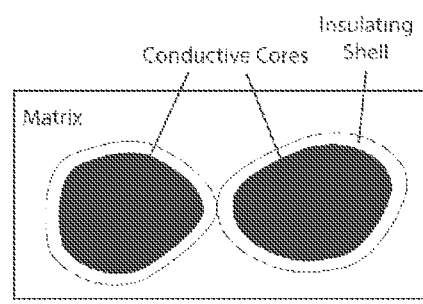
FIG. 5C shows an illustrative example of a tunneling gap between two conductive particles or clusters comprising an inorganic shell completely covering the surface of the conductive particle or cluster.
Figure 5D:
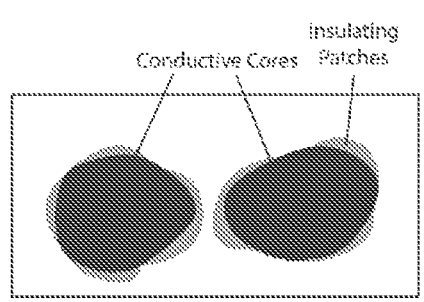
FIG. 5D shows an illustrative example of a tunneling gap between two conductive particles or clusters comprising patches of insulating materials covering the surface of the conductive particle or cluster.
Figure 5E:
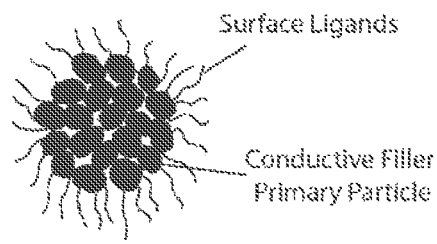
FIG. 5E shows an illustrative example of a cluster of conducting particles covered by surface ligands.

To maintain the tunneling mechanism, it is desirable to create and realize homogeneous and stable tunneling barrier throughout the system. There are many different approaches to creating such an effect. Some examples are shown in FIG. 5. FIG. 5A shows an illustrative example of a tunneling gap between two conductive particles or clusters comprising polymeric chains in the matrix. The steric force among the polymeric chains keeps the two particles or clusters from physically contacting each other. FIG. 5B shows an illustrative example of a tunneling gap between two conductive particles or clusters comprising organic ligands grafted on the surface of the particles or clusters. The steric force among the ligands keeps the two particles or clusters from physically contacting each other. FIG. 5C shows an illustrative example of a tunneling gap between two conductive particles or clusters comprising an inorganic shell complete covering the surface of the conductive particle or cluster. An inorganic core-shell structure may be formed through chemical synthesis. But in many cases, for high throughput manufacturing, a high energy mixing process, such as ball mill or sand mill, the particles together with the shell material is sufficient to create at least a partially covering shell which may be sufficient to serve as a tunneling barrier. FIG. 5D shows an illustrative example of a tunneling gap between two conductive particles or clusters comprising patches of insulating materials covering the surface of the conductive particle or cluster. Also, the conducting particles shown in FIG. 5A to FIG. 5E may comprise clusters of particles bound together either by chemical bonds, hydrogen bonds, or van der Waals force. FIG. 5E shows an illustrative example of a cluster of conducting particles covered by surface ligands.

Another difference between the resistive network and tunneling mechanism lies in the frequency response of the resistivity, or more precisely, impedance, as the two mechanisms have different characteristic capacitive components. And because of the insulating layer present at each tunneling interface, the tunneling mechanism naturally demonstrates a much stronger capacitive component.

In most practical systems, the conductive mechanism is a combination of the two, with a general form for current density as, $$J(E) = \sigma_0 E + AE^n e^{-\frac{B}{E}} \qquad \text{Eq. 4}$$

where E is the local electrical field, $\sigma_0$ is the linear conductivity, and A, B, and n are parameters associated with the specific type of tunneling mechanism and tunneling barrier strength. With different filler and matrix energy level lineup, different types of tunneling may occur. For example, for Fowler-Nordheim tunneling, n equals 2.

By tuning the combination of the two mechanisms, one may achieve specific properties for different applications.

The relative low volume loading contributes to high hysteresis when used as a piezo-resistive sensor. As every time a stress is applied, the conductive filler may move relative to the matrix and the configuration of the conductive percolation may change slightly, resulting in a slight change in resistivity and gauge factor. This small effect may accumulate through repeated application of stress and cause undesirable drifting and hysteresis in the performance when the material is used in a force sensor. For higher filler volume loading, the system is more likely to enter into a glassy state, in that the filler particles are "locked up" by each other and are difficult to move around and the system appears more rigid macroscopically. In this kind of system the piezo-resistive effect is much less likely to demonstrate hysteresis after repeated use. Higher loading, especially higher than percolation threshold loading, also makes such a material easier to be manufactured, as the performance of the material is less likely to be meaningfully impacted by a small amount of deviation of filler concentration caused by fluctuation in the manufacturing process.

Precursor Formulation

The first exemplary illustrative non-limiting embodiment is a precursor formulation, of a piezo-resistive material comprising a solvent, a conductive filler, a dispersant, and a monomer, oligomer, or a polymer.

Said solvent in said precursor formulation may comprise water or any common organic solvents, including but not limited to acetates, alcohols, alkanes, aromatics, carboxylic acids, esters, ethers, hydrocarbons, or ketones.

Said monomer, oligomer, or polymer in said precursor formulation may comprise common polymeric materials including but not limited to at least one repeating unit of an epoxy, a carbonate, an acrylic, an urethane, an imide, an amide, a vinyl, a silazane, a fluorocarbon, an alkyd, a phenolic, a silicone, or a siloxane.

Said monomer, oligomer, or polymer in said precursor formulation may be cured by light, heat, or the combination of both.

Said precursor formulation may further comprise other functional ingredients such as viscosity modifier, adhesion promoter, plasticizer, photo-initiator, thermal initiator, defoamers, or cross-linker, Said conductive filler in said precursor formulation may comprise metal, including but not limited to silver, gold, copper, aluminum, iron, tungsten, platinum, tin, zinc, titanium, nickel, zirconium, pure or doped silicon, pure or doped silicon germanium, or any alloys thereof, or any combination thereof.

Said conductive filler in said precursor formulation may comprise metal oxide, including but not limited to titanium dioxide, ruthenium oxide, zinc oxide, vanadium oxide, indium tin oxide, copper aluminum oxide, doped zinc oxide, indium oxide, or gallium oxide, or any alloys thereof, or any combination thereof.

Said conductive filler in said precursor formulation may comprise carbon based material including but not limited to carbon black, amorphous carbon, graphite, graphite nano-platelet, carbon nanotube, and graphene.

Said conductive filler in said precursor formulation may comprise a core-shell structure with an insulating core and conductive shell, including but not limited to gold or silver coated silica nanoparticles. This geometry significantly lowers the volume loading of the conductive material, if the cost of conductive material, or the coloration, or other undesirable effect from the conductive material is a concern. This structure may also be useful, for example, when the conductive material has a much higher density than the matrix and a low density core may lower the overall density of the filler particle and make the manufacturing process of said precursor formulation easier or more practical.

Said conductive filler in said precursor formulation may comprise a core-shell structure with a conductive core and a thin insulating layer serving as tunneling barrier, such silica coated gold or silver nanoparticles, or any conductive particles or aggregates substantially covered by organic surfactants or ligands. This geometry may provide a more controlled and stable tunneling barrier, resulting in lower noise and lower TCR and TCGF of the piezo-resistive material formed by said precursor formulation.

Said conductive filler in said precursor formulation may comprise conductive polymers, such as poly(thiophene)s (PT), poly(3,4-ethylenedioxythiophene) (PEDOT), poly(p-phenylene sulfide) (PPS), poly(pyrrole)s(PPY), Poly(acetylene)s(PAC), polyanilines(PANI), Poly(acetylene)s(PAC), and Poly(p-phenylene vinylene) (PPV).

Said conductive fillers in said precursor formulation may have primary particle size smaller than 1 μm in at least one dimension, optionally smaller than 500 nm in at least one dimension, optionally smaller than 100 nm in at least one dimension, or optionally smaller than 50 nm in at least one dimension. The primary particle size may be measured using a transmission electron microscope (TEM) or a scanning electron microscope (SEM).

The D50 of the aggregated particle size of said conductive filler in said precursor formulation may be smaller than 1 μm, optionally smaller than 800 nm, optionally smaller than 500 nm, optionally smaller than 400 nm, optionally smaller than 300 nm, and optionally smaller than 200 nm. The D50 aggregate particle size is defined as the 50 percentile in either the accumulative number distribution or accumulative volume distribution as measured by a particle size analyzer such as a Malvern Mastersizer 3000 or a Horiba LA-950 or LA-960 Laser Diffraction Particle Size Analyzer or any similar instruments.

The D99 of the aggregated particle size of said conductive filler in said precursor formulation may be smaller than 5 μm, optionally smaller than 3 μm, optionally smaller than 2 μm, optionally smaller than 1 μm, optionally smaller than 500 nm, optionally smaller than 400 nm, optionally smaller than 300 nm, and optionally smaller than 200 nm. The D99 aggregate particle size is defined as the 99 percentile in either the accumulative number distribution or accumulative volume distribution as measured by a particle size analyzer such as a Malvern Mastersizer 3000 or a Horiba LA-950 or LA-960 Laser Diffraction Particle Size Analyzer or any similar instruments.

The D50 of said conductive filler of said precursor formulation may change less than 50%, optionally less than 40%, optionally less than 30%, optionally less than 20%, optionally less than 10%, optionally less than 5%, optionally less than 2%, optionally less than 1%, after 6 months stored in an air tight container at room temperature.

The primary particle size of said conductive filler in said precursor formulation may have an average aspect ratio smaller than 50:1, optionally smaller than 20:1; optionally smaller than 10:1, optionally smaller than 5:1, and optionally smaller than 3:1, and optionally smaller than 1.5:1. The aspect ratio is defined by the ratio of the largest dimension and smallest dimension of the primary particles. The aspect ratio may be measured using a TEM, an SEM, or any type of super-resolution microscopy.

Said conductive filler in said precursor formulation may have substantially spherical shape, potato-like shape, rice shape, polyhedral shape, oblong shape, small disc, small flake, short needle, bundle, short rod, tetra-pod, or any other common and practical shapes for nanomaterials. The shape of the filler may be measured using a TEM or an SEM.

The volume ratio of said conductive filler to the monomer, oligomer, or polymer in said precursor formulation may be larger than 0.1, optionally larger than 0.15, optionally larger than 0.2, optionally larger than 0.25, optionally larger than 0.3, optionally larger than 0.35, optionally larger than 0.4, and optionally larger than 0.45. The volume ratio may be measured by measuring the density of the material or using thermal gravimetric analysis (TGA) to identify the weight ratio of the filler to the polymeric material, then the volume ratio can be calculated if the densities of each constituent material of said precursor formulation are known.

Said precursor formulation may have viscosity in the range of 0.1 centipoise to 500,000 centipoise, optionally in the range of 0.1 to 50 centipoise, optionally in the range of 50 to 500 centipoise, optionally in the range of 500 to 5000 centipoise, optionally in the range of 5,000 to 50,000 centipoise, optionally in the range of 50,000 to 500,000 centipoise, all at room temperature.

Said precursor formulation may have a thixotropic index, defined as the ratio of viscosity between shear rate of $0.1\ s^{-1}$ and $10\ s^{-1}$ as measured by a viscometer or rheometer, below 10, optionally below 8, optionally below 5, optionally below 3, optionally below 1.1.

The viscosity of said precursor formulation may change less than 200% change in viscosity, optionally less than 100% change in viscosity, optionally less than 50% change in viscosity, optionally less than 10% change in viscosity, after 1 months, optionally after 2 months, optionally after 6 months, stored in an air tight container at room temperature.

Film

Another exemplary illustrative non-limiting embodiment is a film of a piezo-resistive nanocomposite material comprising a conductive filler, a dispersant, and a monomer, oligomer, or a polymer as the matrix, deposited onto a substrate.

Said substrate of the said piezo-resistive film as deposited may comprise any common substrates include by not limited to glass, quartz, semiconductor, wide bandgap semiconductor, any metal or metal alloy, plastic, ceramic, paper, wood, leather, or any natural and synthetic fabrics.

The thickness of said piezo-resistive film is in the range of 10 nm to 1 mm, optionally in the range of 100 nm to 50 µm, optionally in the range of 0.1 µm to 20 µm.

Said monomer, oligomer, or polymer in said precursor formulation may comprise common polymeric materials including but not limited to at least one repeating unit of an epoxy, a carbonate, an acrylic, a urethane, an imide, an amide, a vinyl, a silazane, a fluorocarbon, an alkyd, a phenolic, a silicone, or a siloxane.

Said monomer, oligomer, or polymer in said piezo-resistive film may have a bulk Poisson's Ratio smaller than 0.45, optionally smaller than 0.4, optionally smaller than 0.35, optionally smaller than 0.3, optionally smaller than 0.25, optionally smaller than 0.2.

Said monomer, oligomer, or polymer in said piezo-resistive film may be formed by curing presently disclosed precursor formulation by light, heat, or the combination of both.

Said piezo-resistive film may be formed by common coating processes such as spin coating, slot die coating, draw-bar printing, doctor blade printing, stencil printing, dip coating, screen printing, or inkjet printing.

Said piezo-resistive film may further comprise other functional ingredients such as viscosity modifier, dispersant, adhesion promoter, plasticizer, de-foamer, photo-initiator, thermal initiator, or cross-linker, Said conductive filler in said piezo-resistive film may comprise metal, including but not limited to silver, gold, copper, aluminum, iron, tungsten, platinum, tin, zinc, titanium, nickel, zirconium, pure or doped silicon, pure or doped silicon germanium, pure or doped silicon, or alloys or any combination thereof.

Said conductive filler in said piezo-resistive film may comprise metal oxide, including but not limited to titanium dioxide, ruthenium oxide, zinc oxide, vanadium oxide, indium tin oxide, copper aluminum oxide, doped zinc oxide, indium oxide, or gallium oxide, or any alloys thereof, or any combination thereof.

Said conductive filler in said piezo-resistive film may comprise carbon based material including but not limited to carbon black, graphite, carbon nanotube, graphite nano-platelet, and graphene.

Said conductive fillers in said piezo-resistive film may comprise a core-shell structure with an insulating core and conductive shell, including but not limited to gold or silver coated silica nanoparticles.

Said conductive filler in said piezo-resistive film may comprise a core-shell structure with a conductive core and a thin insulating layer serving as tunneling barrier, including but not limited to silica coated gold or silver nanoparticles; or any conductive particles or aggregates substantially covered by organic surfactants or ligands. This geometry may provide a more controlled and stable tunneling barrier, resulting in lower noise and lower TCR and TCGF.

Said conductive fillers in said piezo-resistive film may comprise conductive polymers, such as poly(thiophene)s (PT), poly(3,4-ethylenedioxythiophene) (PEDOT), poly(p-phenylene sulfide) (PPS), poly(pyrrole)s(PPY), Poly(acetylene)s(PAC), polyanilines(PANI), Poly(acetylene)s(PAC), or Poly(p-phenylene vinylene) (PPV).

Said conductive filler in said piezo-resistive film may have primary particle size smaller than 1 µm in at least one dimension, optionally smaller than 500 nm in at least one dimension, optionally smaller than 100 nm in at least one dimension, and optionally smaller than 50 nm in at least one dimension. The primary particle size may be measured using a TEM, an SEM, an atomic force microscope (AFM), a scanning tunneling microscope (STM), or any type of super-resolution microscopy.

The D50 of the aggregated particle size of said conductive filler in said piezo-resistive film may be smaller than 1 µm, optionally smaller than 800 nm, optionally smaller than 500 nm, optionally smaller than 400 nm, optionally smaller than 300 nm, and optionally smaller than 200 nm. The D50 of the aggregated particle size may be measured using a TEM, an SEM, AFM, a STM, or any type of super-resolution microscopy.

The D90 of the aggregated particle size of said conductive filler in said piezo-resistive film may be smaller than 5 µm, optionally smaller than 3 µm, optionally smaller than 2 µm, optionally smaller than 1 µm, optionally smaller than 500 nm, optionally smaller than 400 nm, optionally smaller than 300 nm, and optionally smaller than 200 nm. The D50 of the aggregated particle size may be measured using a TEM, an SEM, AFM, a STM, or any type of super-resolution microscopy.

Said conductive filler in said piezo-resistive film may have an average aspect ratio smaller than 50:1, optionally smaller than 10:1; optionally smaller than 5:1; and optionally smaller than 3:1, optionally smaller than 1.5:1. The aspect ratio is defined by the ratio of the largest dimension and smallest dimension of the primary particles. The aspect ratio may be measured using a TEM, an SEM, AFM, a STM, or any type of super-resolution microscopy.

Said conductive filler in said piezo-resistive film may have substantially spherical shape, potato-like shape, rice shape, polyhedral shape, oblong shape, small disc, small flake, short needle, bundle, short rod, tetra-pod, or any other common and practical shapes for nanomaterials. The shape of the filler may be measured using TEM, an SEM, AFM, a STM, or any type of super-resolution microscopy.

Said conductive filler in said piezo-resistive film may have loading level near or above the percolation threshold for spherical particles in a matrix. Said conductive filler having loading level higher than 10% by volume in said nanocomposite material, optionally having loading level higher than 11% by volume in said nanocomposite material, optionally having loading level higher than 12% by volume in said nanocomposite material, optionally having loading level higher than 13% by volume in said nanocomposite material, optionally having loading level higher than 14% by volume in said nanocomposite material, optionally having loading level higher than 15% by volume in said nanocomposite material optionally having loading level higher than 16% by volume in said nanocomposite material, optionally having loading level higher than 17% by volume in said nanocomposite material, optionally having loading level higher than 18% by volume in said nanocomposite material, optionally having loading level higher than 19% by volume in said nanocomposite material, optionally having loading level higher than 20% by volume in said nanocomposite material, optionally having loading level higher than 25% by volume in said nanocomposite material, optionally having loading level higher than 30% by volume in said nanocomposite material. The volume loading may be measured by measuring the density of the material or using thermal gravimetric analysis (TGA) to identify the weight ratio of the filler to the organic matrix, then the volume ratio can be calculated if the densities of each of the constituent materials of said nanocomposite material are known.

Said piezo-resistive film may have a resistivity, at room temperature, in the range of 0.001 to 0.1 Ω-cm, optionally in the range of 0.1 to 10 Ω-cm, optionally in the range of 10 to 1000 Ω-cm, optionally in the range of 1000 to 100,000 Ω-cm. The resistivity may be measured using a common Multimeter, such as an Agilent 34401A digital Multimeter. The films may be patterned into known geometry with proper electrical contacts and the resistance may be measured using either a standard two wire or four wire configuration and the resistivity can be calculated from the measured resistance.

Said piezo-resistive film may have a current density vs. electrical field (J-E) relationship in the form of Eq. 4. In the temperature range of 0° C. to 120° C., and optionally in the range of 0° C. to 60° C., and in the electrical field range of 1 V/cm to 10,000 V/cm. The J-E curve can be measured using standard 2-wire or 4-wire measurement configuration. The films will be patterned into known geometry with proper electrical contacts and the electrical field and current density can be calculated. At a given temperature, at least twenty data points that are sufficiently equally distanced in the measured electrical field range may be measured and the resulting J-E curve may be fit to the aforementioned general form using a least square (LS) method.

Said piezo-resistive film may have a resistivity change less than 50%, optionally less than 30%, optionally less than 20%, optionally less than 10% optionally less than 5%, optionally less than 3%, optionally less than 1%, after being exposed to 250 C for 30 minutes in air.

Said piezo-resistive film may have a gauge factor change less than 50%, optionally less than 30%, optionally less than 20%, optionally less than 10% optionally less than 5%, optionally less than 3%, optionally less than 1%, after being exposed to 250 C for 30 minutes in air.

Said piezo-resistive film may have a gauge factor greater than 1, optionally greater than 5, optionally greater than 10, optionally greater than 15, optionally greater than 20, under tensile strain. The gauge factor may be measured with ASTM E251 or similar methods.

Said piezo-resistive film may have a GF greater than 1, optionally greater than 5, optionally greater than 10, optionally greater than 15, optionally greater than 20, under compressive strain. The gauge factor may be measured with ASTM E251 or similar methods.

Said piezo-resistive film may have a TCR less than 10,000 ppm, optionally less than 5,000 ppm, optionally less than 1,000 ppm, optionally less than 500 ppm, optionally less than 100 ppm, optionally less than 50 ppm. TCR is defined as |R60-R20|/R20/40, where R60 and R20 are the resistance of the test resistor at 60° C. and 20° C. respectively.

Resistive Force Sensor

Another exemplary illustrative non-limiting embodiment is a resistive force sensor comprising at least one variable resistor at least partially comprising the presently disclosed piezo-electric film built on a substrate.

Said substrate of the resistive force sensor may include the force accepting surface. Said resistive force sensor may be further attached to a structure which includes the force accepting surface. Said attaching may include clamping, gluing, or bonding.

Said resistive force sensor may demonstrate substantial linear response to applied transverse force in the range of 0.001 N to 100 N, optionally in the range of 0.01 to 10 N, under a tensile strain.

Said resistive force sensor may demonstrate substantial linear response to applied transverse force in the range of 0.001 N to 100 N, optionally in the range of 0.01 to 10 N, under a compressive strain.

Said resistive force sensor may demonstrate a signal to noise ratio larger than 100:1, optionally larger than 10:1, optionally larger than 3:1, optionally larger than 1:1, when a 2 N transverse force is applied.

Said variable resistor in said resistive force sensor may have a less than 10%, optionally less than 5%, optionally less than 1%, optionally less than 0.1% change in resistance at the same measurement temperature after being subject to more than 1,000,000 times of the repeated application of the same applied transverse force. The hysteresis of said resistive force sensor may be measured with ASTM 1578 or similar methods.

Said resistive force sensor may have a less than 10%, optionally less than 5%, optionally less than 1%, optionally less than 0.1% change in Gauge Factor at the same measurement temperature after being subject to more than 1,000,000 times of the repeated application of the same applied transverse force. The hysteresis of said resistive force sensor may be measured with ASTM 1578 or similar methods.

Device

Another exemplary illustrative non-limiting embodiment is a tactile or force sensor comprising presently disclosed piezo-resistive film.

Said tactile or force sensor may be used in applications described in the BACKGROUND AND SUMMARY section.

EXAMPLES

Example 1

A precursor formulation comprises carbon black fillers, an epoxy resin, and isophorone as solvent. The precursor formulation also contains common dispersant and other functional additives at proper concentrations. The dispersant, functional additives, and the epoxy resin were first dissolved in the isophorone with desired ratio using a mechanical mixer to form a solution. The carbon black was then added into the solution and mixed using a high shear disperser for 5 to 60 minutes to form a premix. Said premix was then loaded into a Netzsch LabStar mill to be milled for 10 to 120 minutes with water cooling to keep the temperature below 20° C. The mixture was then loaded into a common deaerator to remove any low boiling point components and air bubbles. The product was then extracted and stored in air tight bottles for future use.

The volume ratio of said carbon black to the epoxy resin was in the range of 0.15 to 0.25. The D50 of the carbon black, as measured by a Horiba LA-950 was in the range of 250 nm to 450 nm. The aspect ratio of the primary aspect ratio of said carbon black is less than 10:1, as measure by a TEM or AFM. The viscosity of said precursor formulation was in the range of 5000 to 10,000 cps at room temperature measured with a Brookfield DV2T viscometer with a #27 spindle at 30 rpm, and the thixotropic index of the formulation was found to be below 5. The viscosity changed less than 100% after 60 day storage in an air tight container at room temperature.

Example 2

Another example is a piezo-resistive film formed by the precursor formulation of Example 1. The precursor formulation was extracted from the air tight container and films were deposited by screen printing onto polyimide, glass, or polyethylene terephthalate (PET) substrates and patterned into a stripes 0.4 mm to 1 mm wide with different length. The films were then baked in air at 100° C. to 250° C. for less than 120 minutes. Patterned silver paste was applied on top, and then baked in air at 100° C. to 150° C. for less than 60 minutes to form ohmic contacts.

The piezo-resistive film was ~10 um thick as measured by a surface profilometer. The resistivity of the film was in the range of 0.5 ohm-cm to 1.5 ohm-cm by measuring the resistance of the patterned film using an Agilent 34401 Multimeter and then calculated based on the geometry of the patterned film. The gauge factor was measured to be in the range 5 to 13 as measured using a method similar to ASTM E251, with applied transverse force in the range in the 200 gram to 1000 gram. The TCR of the film was measured in an oven with temperature control and was found to be less than 1000 ppm and in many cases less than 500 pm, and in many cases less than 100 ppm.

The patterned piezo-resistive film was also used as a variable resistor in a resistive force sensor built directly on a 0.55 mm thick glass substrate, which includes the force accepting surface. The resistive force sensor was then subjected to multiple test cycles to examine the hysteresis in resistance and gauge factor. Each test cycle comprises pressing the glass plate directly on top of the resistive force sensor with a fixed force then fully releasing the force. Tests with 200 grams and 500 grams traverse force were carried out. Both the resistance of the variable resistor under zero applied force ($R_{G0}$), and the GF of the resistive force sensor demonstrated less than 6% change after 1,000,000 test cycles with either 200 grams or 500 grams applied force; less than 20% change in both the $R_{G0}$ and GF after 50,000,000 times of pressing with either 200 grams or 500 grams of applied force. Similar results were also obtained with a resistive force sensor built on a PET substrate then glued onto a 0.8 mm thick stainless steel plate as the supporting surface, which includes the force accepting surface.

The patterned piezo-resistive film was also subject to solder reflow process. It was heated to 250° C. for 1 to 10 minutes and it was found that the resistivity changed less than 30% and the GF changed less than 25% within the range of the applied force.

Example 3

A precursor formulation comprises carbon black fillers, a fluorocarbon resin, and isophorone as solvent. The precursor formulation also contained common dispersant and other functional additives at proper concentrations. The dispersant, functional additives, and the fluorocarbon resin were first dissolved in the isophorone with desired ratio using a mechanical mixer to form a solution. The carbon black was then added into the solution and mixed using a high shear disperser for 5 to 60 minutes to form a premix. Said premix was then loaded into a Netzsch LabStar mill to be milled for 10 to 120 minutes with water cooling to keep the temperature below 20° C. The mixture was then loaded into a common deaerator to remove any low boiling point components and air bubbles. The product was then extracted and stored in air tight bottles for future use.

The volume ratio of said carbon black to the fluorocarbon resin was in the range of 0.15 to 0.25. The D50 of the carbon black, as measured by a Horiba LA-950, was in the range of 250 nm to 450 nm. The aspect ratio of the primary aspect ratio of said carbon black is less than 10:1, as measure by a TEM or AFM. The viscosity of said precursor formulation was in the range of 5000 to 10,000 cps at room temperature measured with a Brookfield DV2T viscometer with a #27 spindle at 30 rpm, and the thixotropic index of the formulation was found to be below 5. The viscosity changed less than 100% after 60 day storage in an air tight container at room temperature.

Example 4

Another example is a piezo-resistive film formed by the precursor formulation of Example 3. The precursor formulation was extracted from the air tight container and films were deposited by screen printing onto polyimide, glass, or polyethylene terephthalate (PET) substrates and patterned into stripes 0.4 mm to 1 mm wide with different length. The films were then baked in air at 100° C. to 250° C. for less than 120 minutes. Patterned silver paste was applied on top, and then baked in air at 100° C. to 150° C. for less than 60 minutes to form ohmic contacts.

The piezo-resistive film was ~10 um thick as measured by a surface profilometer. The resistivity of the film was in the range of 0.5 ohm-cm to 1.5 ohm-cm by measuring the resistance of the patterned film using an Agilent 34401 Multimeter and then calculated based on the geometry of the patterned film. The gauge factor was measured to be in the range 5 to 13 as measured using a method similar to ASTM E251, with applied transverse force in the range in the 200 gram to 1000 gram. The TCR of the film was measured in an oven with temperature control and was found to be less than 1000 ppm and in many cases less than 500 pm, in many cases less than 100 ppm, and in many cases less than 50 ppm.

The patterned piezo-resistive film was also used as a variable resistor in a resistive force sensor built directly on a 0.55 mm thick glass substrate, which includes the force accepting surface. The resistive force sensor was then subjected to multiple test cycles to examine the hysteresis in resistance and gauge factor. Each test cycle comprises pressing the glass plate directly on top of the resistive force sensor with a fixed force then fully releasing the force. Tests with 200 grams and 500 grams traverse force were carried out. Both the resistance of the variable resistor under zero applied force ($R_{G0}$), and the GF of the resistive force sensor demonstrated less than 6% change after 1,000,000 test cycles with either 200 grams or 500 grams applied force; less than 20% change in both the $R_{G0}$ and GF after 50,000,000 times of pressing with either 200 grams or 500 grams of applied force. Similar results were also obtained with resistive force sensor built on a PET substrate then glued onto a 0.8 mm thick stainless steel plate as the supporting surface, which includes the force accepting surface.

The patterned piezo-resistive film was also subject to solder reflow process. It was heated to 250° C. for 1 to 10 minutes and it was found that the resistivity changed less than 30% and the GF changed less than 25% within the range of the applied force.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A piezo-resistive film comprising:
   a conductive filler comprising a primary particle having a D50 size less than 1 μm, a D90 size less than 2 μm and an aspect ratio less than 5:1,
   a monomer, oligomer, or polymer matrix having a Poisson's Ratio less than 0.35, and
   a substrate,
   wherein the conductive filler has a loading higher than 10% by volume and the piezo-resistive film demonstrates a gauge factor larger than 5.

2. The piezo-resistive film of claim 1 wherein the loading of the conductive filler is higher than 15% by volume.

3. The piezo-resistive film of claim 1 wherein the loading of the conductive filler is higher than 25% by volume.

4. The piezo-resistive film of claim 1 wherein the loading of the conductive filler is higher than 40% by volume.

5. The piezo-resistive film of claim 1 wherein the primary particle of said conductive filler has an aspect ratio less than 3:1.

6. The piezo-resistive film of claim 1 wherein the primary particle of said conductive filler has an aspect ratio less than 1.5:1.

7. The piezo-resistive film of claim 1 wherein said conductive filler has a substantially spherical shape, potato-like shape, rice shape, polyhedral shape, oblong shape, small disc, small flake, short needle, bundle, short rod, tetra-pod, or any other common and practical shapes for nanomaterials.

8. The piezo-resistive film of claim 1 wherein said conductive filler comprises at least one of silver, gold, copper, aluminum, iron, tungsten, platinum, tin, zinc, titanium, nickel, zirconium, pure or doped silicon, pure or doped silicon germanium, titanium dioxide, ruthenium oxide, zinc oxide, vanadium oxide, indium tin oxide, copper aluminum oxide, doped zinc oxide, indium oxide, or gallium oxide, or any alloys thereof.

9. The piezo-resistive film of claim 1 wherein said conductive filler comprises at least one of carbon black, graphite, carbon nanotube, graphite nano-platelet, or graphene.

10. The piezo-resistive film of claim 1 wherein said conductive filler comprises at least one of poly(thiophene)s (PT), poly(3,4-ethylenedioxythiophene) (PEDOT), poly(p-phenylene sulfide) (PPS), poly(pyrrole)s(PPY), Poly(acetylene)s(PAC), polyanilines(PANI), Poly(acetylene)s(PAC), or Poly(p-phenylene vinylene) (PPV).

11. The piezo-resistive film of claim 1 wherein said conductive filler comprises a core-shell structure with an insulating core and a conductive shell.

12. The piezo-resistive film of claim 1 wherein said conductive filler comprises a core-shell structure with a conductive core and a thin insulating shell.

13. The piezo-resistive film of claim 1 wherein said monomer, oligomer, or polymer matrix comprises at least one repeating unit of an epoxy, a carbonate, an acrylic, a urethane, an imide, an amide, a vinyl, a silazane, a fluorocarbon, an alkyd, a phenolic, a silicone, or a siloxane.

14. The piezo-resistive film of claim 1 wherein the thickness of the film is less than 20 μm.

15. The piezo-resistive film of claim 1 wherein the resistivity of said film is in the range of 0.1 to 10 a-cm at room temperature.

16. The piezo-resistive film of claim 1 wherein the TCR of said film is less than 500 ppm.

17. The piezo-resistive film of claim 1 wherein the gauge factor of said film is larger than 5 under compressive strain.

18. The piezo-resistive film of claim 1 wherein the gauge factor of said film is larger than 5 under tensile strain.

19. The piezo-resistive film of claim 1 wherein a conducting mechanism of the conductive filler is a combination of ohmic conduction and electrical tunneling.

20. The piezo-resistive film of claim 1 wherein the substrate comprises glass, quartz, semiconductor, wide bandgap semiconductor, any metal or metal alloy, plastic, ceramic, paper, wood, leather, or any natural and synthetic fabrics.

21. A resistive force sensor comprising at least one variable resistor including said piezo-resistive film of claim 1.

22. The resistive force sensor of claim 21 built on a substrate including a force accepting surface.

23. The resistive force sensor of claim 21 attached to a structure including a force accepting surface.

24. The resistive force sensor of claim 21 having a substantially linear output under 0.001 N to 10 N transverse applied force.

25. The resistive force sensor of claim 21, wherein the variable resistor has a repeatability of less than 10% change in resistance after being subject to 1,000,000 times repeated pressing with 5N of applied transverse force.

26. The resistive force sensor of claim 21 having a repeatability of less than 10% change in gauge factor after being subject to 1,000,000 times repeated pressing with 5 N of applied transverse force.

27. A piezo-resistive film comprising:
   a conductive filler comprising a primary particle having a D50 size less than 1 μm and a D90 size less than 2 μm,
   a monomer, oligomer, or polymer matrix having a Poisson's Ratio less than 0.35, and
   a substrate,
   wherein the primary particle of the conductive filler has an aspect ratio less than 10:1 and the piezo-resistive film has a gauge factor larger than 5.

28. The piezo-resistive film of claim 27, wherein the aspect ratio of the primary particle of said conductive filler is less than 5:1.

29. A resistive force sensor comprising at least one variable resistor including said piezo-resistive film of claim 27.

* * * * *